United States Patent
Schmitt et al.

(10) Patent No.: US 12,529,408 B2
(45) Date of Patent: Jan. 20, 2026

(54) VIBRATION DAMPER HAVING TWO ADJUSTABLE DAMPING VALVE DEVICES

(71) Applicant: ZF Friedrichshafen AG, Friedrichshafen (DE)

(72) Inventors: Stefan Schmitt, Gochsheim (DE); Bernd Zeissner, Volkach (DE); Lukas Ruhmann, Gremsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1114 days.

(21) Appl. No.: 17/608,721

(22) PCT Filed: May 4, 2020

(86) PCT No.: PCT/EP2020/062309
§ 371 (c)(1),
(2) Date: Nov. 3, 2021

(87) PCT Pub. No.: WO2020/225205
PCT Pub. Date: Nov. 12, 2020

(65) Prior Publication Data
US 2022/0316546 A1 Oct. 6, 2022

(30) Foreign Application Priority Data
May 6, 2019 (DE) .................. 102019206455.8

(51) Int. Cl.
*F16F 9/46* (2006.01)
*F16F 9/06* (2006.01)
(Continued)

(52) U.S. Cl.
CPC ............. *F16F 9/46* (2013.01); *F16F 9/065* (2013.01); *F16F 9/185* (2013.01); *F16F 9/325* (2013.01); *F16F 9/3257* (2013.01)

(58) Field of Classification Search
CPC ..... F16F 9/46; F16F 9/065; F16F 9/185; F16F 9/325; F16F 9/3257; F16F 9/064; F16F 9/3242; F16F 9/062
See application file for complete search history.

(56) References Cited

U.S. PATENT DOCUMENTS 3,815,361 A * 6/1974 Manini .................. E05F 15/53
60/403
4,709,791 A 12/1987 Houghton
(Continued)

FOREIGN PATENT DOCUMENTS

DE 1455903 A1 6/1969
DE 19547910 C1 1/1997
(Continued)

OTHER PUBLICATIONS

International Search Report and Written Opinion for PCT/EP2020/062309 mailed Aug. 11, 2020 (11 pages; with 1 English translation).

*Primary Examiner* — Robert A. Siconolfi
*Assistant Examiner* — James K Hsiao
(74) *Attorney, Agent, or Firm* — Kristin L. Murphy

(57) ABSTRACT

The disclosure relates to a vibration damper comprising two adjustable damping valve devices, wherein a damping valve device is connected to a piston-rod-side working chamber via a fluid connection and a damping valve device is connected to a working chamber spaced apart from a piston rod within a cylinder filled with damping medium. A fluid connection between the damping valve device and the working chamber occurs via at least one tube element. Both adjustable damping valve devices are connected to a common balancing chamber for receiving the damping medium displaced out of the working chambers by the piston rod. A line block is connected to the cylinder, which forms a first fluid connection to the damping valve device for one of the working chambers and forms an intermediate tube, encasing (Continued)

the cylinder, for a second fluid connection to the damping valve device for the other of the two working chambers. The second fluid connection is also connected to the line block. Both fluid connections have a separate radial channel within the line block, each being connected to an inlet opening of the damping valve devices. A reducer part is arranged between the cylinder and the first fluid line of the line block, and the second fluid line runs within the line block within a projection surface of the cylinder.

19 Claims, 6 Drawing Sheets

(51) Int. Cl.
*F16F 9/18* (2006.01)
*F16F 9/32* (2006.01)

(56) References Cited

U.S. PATENT DOCUMENTS

| | | | | |
|---|---|---|---|---|
| 4,960,188 | A * | 10/1990 | Wossner | F16F 9/36 |
| | | | | 188/315 |
| 5,178,240 | A * | 1/1993 | Houghton | F16F 9/44 |
| | | | | 188/315 |
| 5,586,627 | A * | 12/1996 | Nezu | F16F 9/46 |
| | | | | 188/266.6 |
| 5,740,890 | A * | 4/1998 | Forster | F16F 9/325 |
| | | | | 188/322.13 |
| 5,788,030 | A * | 8/1998 | Rottenberger | F16F 9/34 |
| | | | | 188/290 |
| 7,950,506 | B2 * | 5/2011 | Nowaczyk | F16F 9/466 |
| | | | | 188/315 |
| 10,655,701 | B2 * | 5/2020 | Manger | F16F 9/369 |
| 11,692,606 | B2 * | 7/2023 | Manger | F16F 9/54 |
| | | | | 188/266.6 |
| 2015/0047937 | A1 * | 2/2015 | Kim | F16F 9/461 |
| | | | | 188/322.13 |
| 2015/0191069 | A1 * | 7/2015 | Zuleger | F16F 9/5123 |
| | | | | 280/124.16 |
| 2016/0281815 | A1 * | 9/2016 | Teraoka | F16F 9/061 |
| 2017/0218984 | A1 | 8/2017 | Ogawa | |
| 2018/0355940 | A1 * | 12/2018 | Manger | F16F 9/369 |
| 2019/0136932 | A1 * | 5/2019 | Deferme | F16F 9/46 |
| 2020/0124129 | A1 * | 4/2020 | Mohammadi | B21D 53/88 |
| 2020/0208704 | A1 * | 7/2020 | Deferme | F16F 9/325 |
| 2020/0208705 | A1 * | 7/2020 | Deferme | B60G 13/08 |
| 2021/0164533 | A1 * | 6/2021 | Zeissner | F16F 9/32 |

FOREIGN PATENT DOCUMENTS

| | | |
|---|---|---|
| DE | 10315088 A1 | 10/2004 |
| DE | 102005053394 A1 | 5/2006 |
| DE | 102012202100 A1 | 8/2013 |
| DE | 102013218658 A1 | 3/2015 |
| DE | 102015218296 A1 | 3/2016 |
| DE | 102014225702 A1 | 6/2016 |
| DE | 102017209609 A1 | 12/2018 |
| EP | 3211263 A1 | 8/2017 |
| WO | 2017137189 A1 | 8/2017 |

* cited by examiner

VIBRATION DAMPER HAVING TWO ADJUSTABLE DAMPING VALVE DEVICES

CROSS-REFERENCE TO RELATED APPLICATIONS

This application is a national stage of International Application No. PCT/EP2020/062309, filed Mar. 4, 2020, the disclosure of which is incorporated herein by reference in its entirety, and which claimed priority to German Patent Application No. 102019206455.8, filed May 6, 2019, the disclosure of which is incorporated herein by reference in its entirety.

TECHNICAL FIELD

The disclosure concerns a vibration damper having two adjustable damping valve devices.

BACKGROUND

DE 10 2017209 609 A1 discloses a vibration damper with two adjustable damping valve devices. A damping valve device is available for each working direction of the vibration damper. Accordingly, separate fluidic connections between a respective working chamber and its connected damping valve device must also be provided.

In DE 10 2017 209 609 A1 therefore, two intermediate tubes are used which are damped on the outside onto a cylinder tube. At least one radial fluid port is present in both working chambers of the cylinder tube, and connects a working chamber to a fluidic connection inside the intermediate tube. Each intermediate tube has a port connector. A radial distance between the two damping valve devices is therefore determined by an outer diameter of the cylinder tube and a radial width of the annular fluidic connection.

The two damping valve devices should be arranged axially as dose as possible to a bottom of the vibration damper, in order to be effective with the minimum possible fill quantity in a balancing chamber without foaming of a damping medium. Accordingly, there is an installation space conflict between the damping valve devices and axle components inside a wheel box in a vehicle.

The vibration damper in DE 10 2017 209 609 A1 comprises a single balancing chamber to which both adjustable damping valve devices are connected in the outflow direction.

DE 10 2012 202 100 A1 also discloses a vibration damper with two adjustable damping valve devices. A first damping valve device is arranged in a first housing, and a second damping valve device is arranged in a second housing. The first housing is attached axially in line with a cylinder of the vibration damper. The two damping valve devices extend radially to a longitudinal axis of the vibration damper and are axially offset. For a flow connection, a hollow piston rod and a stand tube are provided. As a whole, this design is relatively complex and requires a comparatively large axial and radial installation space. Furthermore, two separate balancing chambers are used, i.e. an adjustable damping valve device is connected to only one balancing chamber in the outflow direction.

DE 10 2105 218 296 A1 concerns a vibration damper with two adjustable damping valve devices and two balancing chambers. The flow paths between the working chambers in a working cylinder are designed comparatively simply, since a fork-like housing is used in which fluid lines run.

What is needed, a simple solution for the design of fluidic connections between the working chambers, two adjustable damping valves and a common balancing chamber, wherein only little installation space is required both axially and radially.

SUMMARY

This disclosure has a line block that is connected to a cylinder and forms a first fluidic connection to a damping valve device for one of the working chambers, and forms an intermediate tube encasing the cylinder for a second fluidic connection to the damping valve device for the other of the two working chambers, wherein the second fluidic connection is also connected to the line block and the two fluidic connections each have a separate radial channel inside the line block which is connected to a respective inlet opening of the damping valve devices. A reducing piece is arranged between the cylinder and the first fluid line of the line block, and the second fluid line runs inside the line block within a projection surface of the cylinder.

Because of the design of the fluidic connections, the two damping valve devices may be positioned with a smaller radial distance from one another.

In a further advantageous exemplary arrangement, the radial channels are axially congruent. As a result, the axial installation space requirement for the two damping valve devices and hence the entire vibration damper is optimized.

With a view to ease of production of the line block, in one exemplary arrangement, the reducing piece is formed by a component separate from the line block.

According to a further advantageous exemplary arrangement, the first fluid line is connected to a bottom valve of the vibration damper which is arranged between the working chamber remote from the piston rod and the balancing chamber. Thus the bottom valve or a bottom valve body may have an outer diameter which is the same as in an installation situation directly in the cylinder.

In a further exemplary arrangement, the cylinder is encased by a container tube, wherein the container tube has a greater outer diameter in a region congruent with the cylinder than in the region congruent with the line block. The advantage achieved by the installation space for the line block can thus be transferred to the container tube.

With a view to simplify flow paths inside the vibration damper, in one exemplary arrangement, a check valve is assigned to each damping valve device and to the respectively connected fluidic connection, and opens in the flow direction from the balancing chamber to the fluidic connection. The check valve prevents a reduced pressure in a working chamber which expands during the piston rod movement.

Optionally, in one exemplary arrangement, the intermediate tube may be centered on a connector of the line block. Thus there is no carrying connection between the cylinder and the intermediate tube. Consequently, there is no need for a seal between these two components.

In one exemplary arrangement, if the connector has a connection diameter which is the same as the connection diameter to a piston rod guide, the intermediate tube may be formed by a simple semifinished product on which no radial forming work is necessary.

A further measure for simple production of the fluidic connections is for the line block, together with a peripheral annular web and an end face, to form an end region of the balancing chamber, wherein a receiving chamber for the adjustable damping valve device is axially congruent with the balancing chamber. A single window in the annular web provides a flow connection between the damping valve device and the balancing chamber.

Optionally, in one exemplary arrangement, the line block may have a first and a second fluid port for a pump device, in order to pump damping medium between the balancing chambers with the aim of changing the ride height of the vibration damper.

BRIEF DESCRIPTION OF DRAWINGS

The disclosure will be explained in more detail with reference to the following description of the figures.

The drawings show.

DETAILED DESCRIPTION

Figure 1:
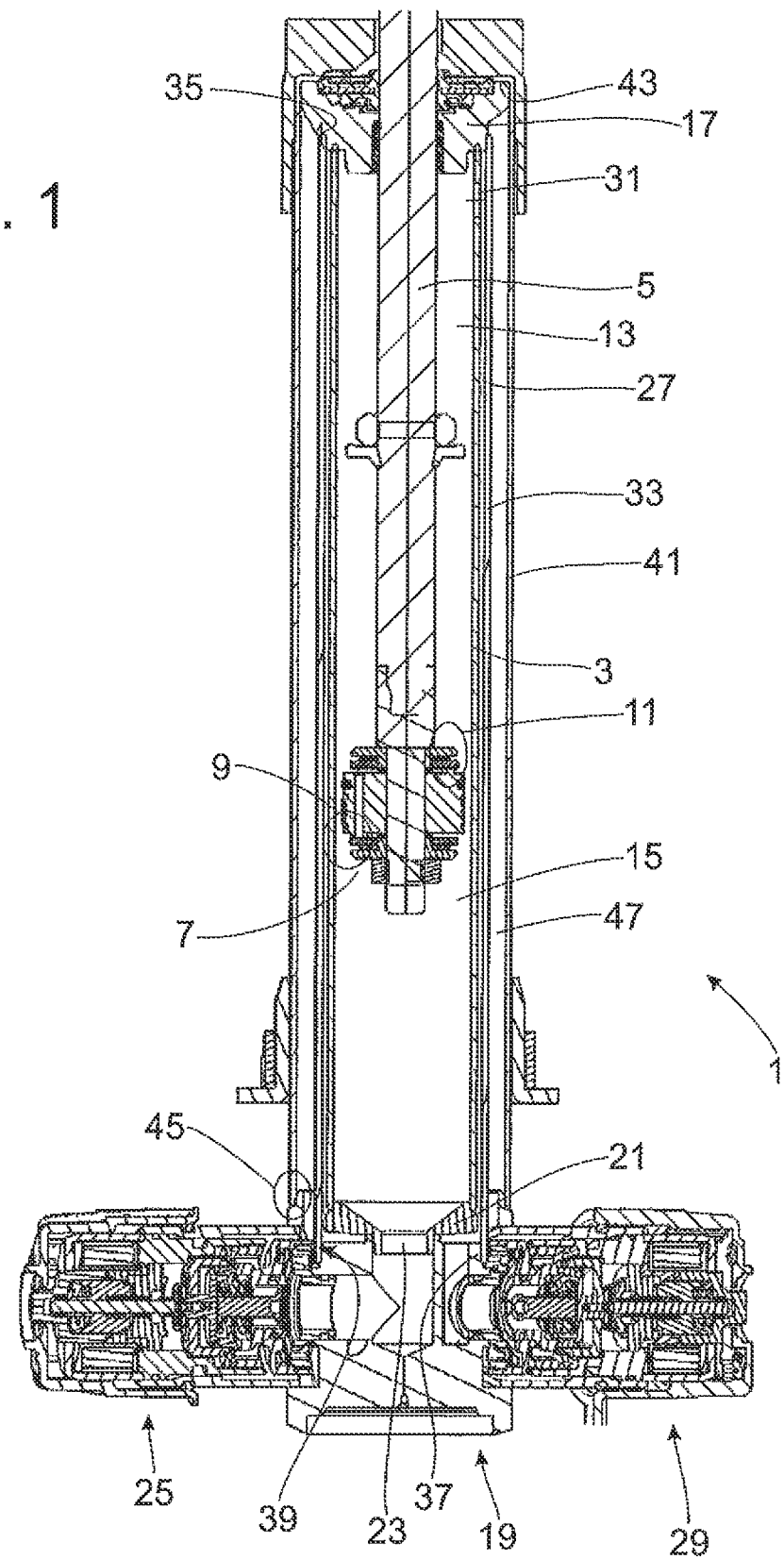
FIG. 1 a longitudinal section through a vibration damper.

FIG. 1 shows a longitudinal section through a vibration damper 1 with a cylinder 3 in which an axially movable piston rod 5 with a piston 7 is guided. Fluid can flow through the piston 7 via damping valves 9; 11 on both sides; the piston divides the cylinder 3 into working chambers 13; 15 on the piston rod side and the side remote from the piston rod. Both working chambers are completely filled with a hydraulic damping medium.

The working chamber 13 on the piston rod side is dosed at an end thereof by a piston rod guide 17. At an opposite end of the cylinder 3, a line block 19 is arranged in line with the cylinder 3, and a hopper-like reducing piece 21 is arranged between the cylinder 3 and the line block 19. The reducing piece 21 includes an annular bottom for the working chamber 15 with a first fluidic connection 23 to an adjustable damping valve device 25. In this exemplary arrangement, the reducing piece 21 is formed by a separate component from the line block 19, in particular to simplify the manufacturing of the line block 19. In one exemplary arrangement, the reducing piece 21 could also be a fixed part of the wall of the cylinder 3, i.e. be integral with or welded to the cylinder 3.

The working chamber 13 on the piston rod side is connected to a second damping valve device 29 via a second fluidic connection 27. The second fluidic connection 27 is connected to the working chamber 13 on the piston rod side via a connection opening 31 inside the piston rod guide 17 or in a region of the cylinder 3 over which the piston 7 does not pass.

The cylinder 3 is encased by an intermediate tube 33 which lies on a connection region 35 of the piston rod guide 17 and hence is positioned radially to the cylinder 3. An annular chamber between the intermediate tube 33 and an outer casing surface of the cylinder 3 forms the longest portion of the second fluidic connection 29.

At its other end, the intermediate tube 33 is centered and held by a connector 37 of the line block 19, the connecting region 39 of which has the same connection diameter as the connection region 35 on the piston rod guide 17.

The cylinder 3 and the intermediate tube 33 are in turn encased by an outer container tube 41. The container tube 41 extends from an outer end face 43 of the piston rod guide 17 to a centering lug 45 of the line block 19. Accordingly, the line block 19 forms an end closure for the entire vibration damper 1.

An annular chamber between the intermediate tube 33 and an inner wall of the container tube 41 forms a balancing chamber 47 which is only partly filled with damping medium and compensates for the damping medium volume displaced from the working chambers 13; 15 of the cylinder 3 by the piston rod 5. Both adjustable damping valve devices 25; 29 are connected to the common balancing chamber 47 in an outflow direction.

Figure 2:
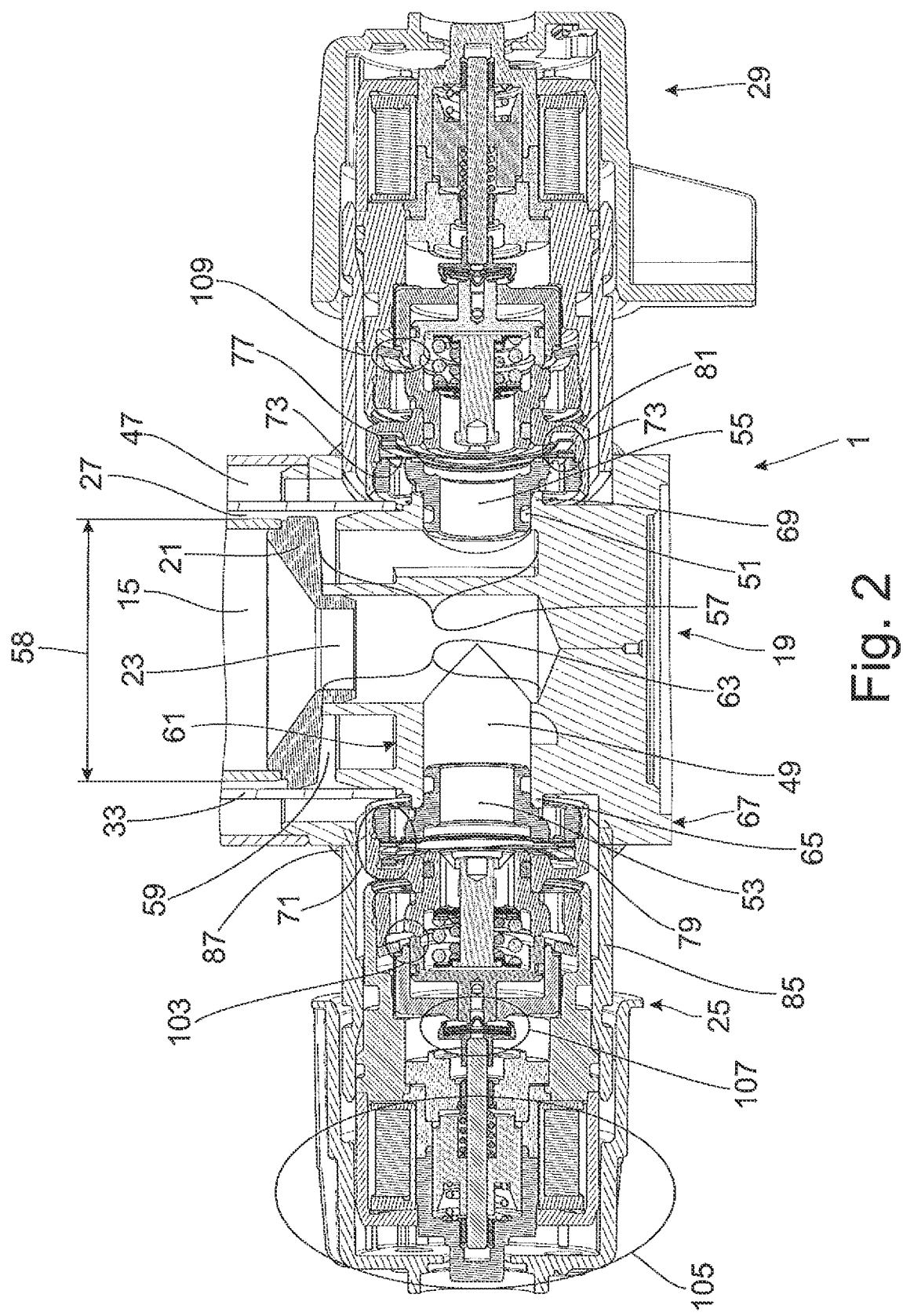
FIG. 2 a detail illustration from FIG. 1.
Figure 3:
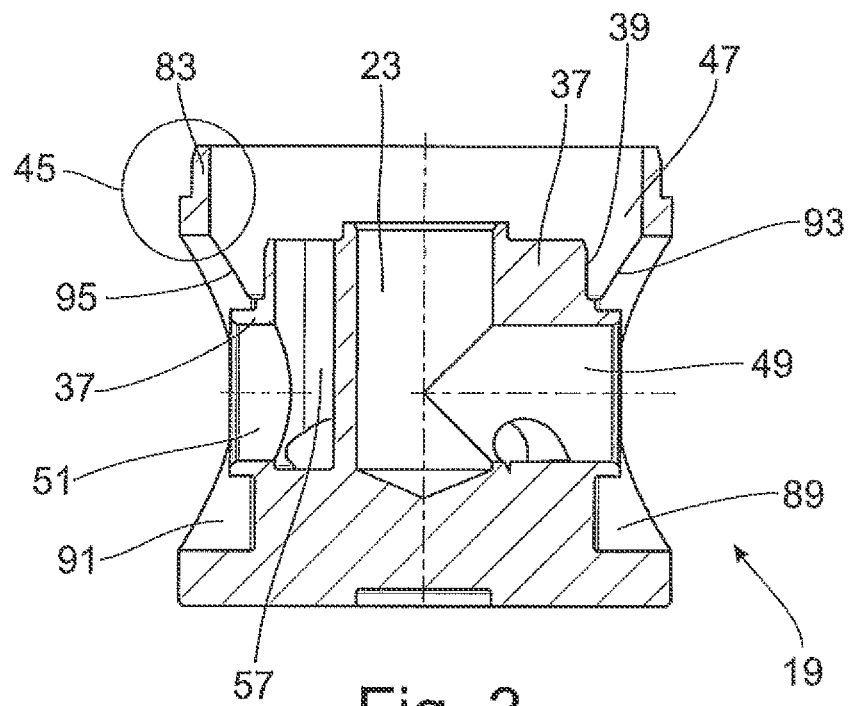
FIGS. 3-7 a line block as a separate component.
Figure 4:
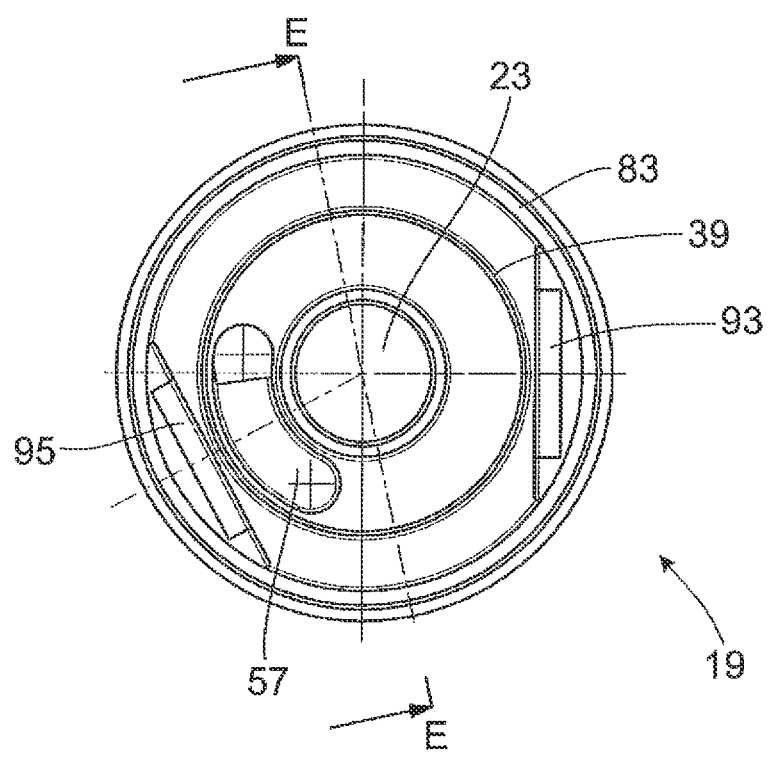
Figure 5:
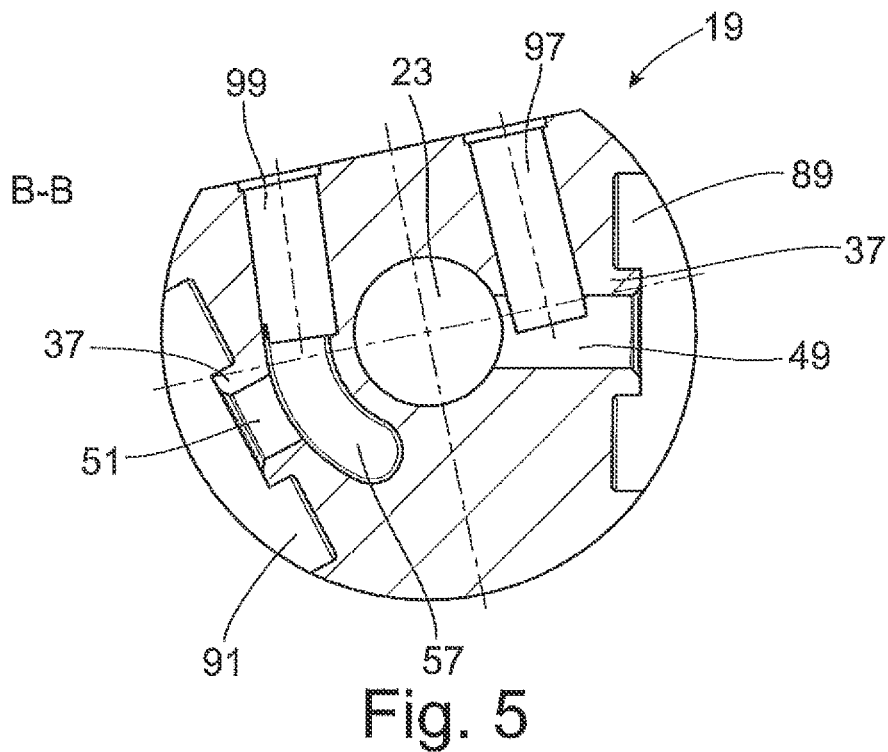
Figure 6:
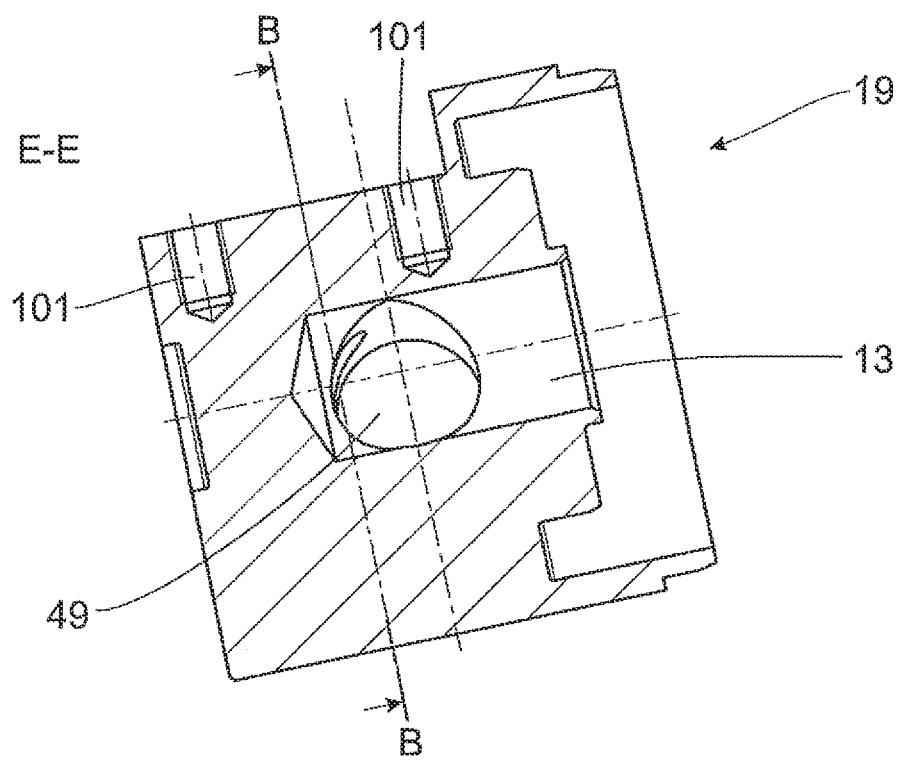
Figure 7:
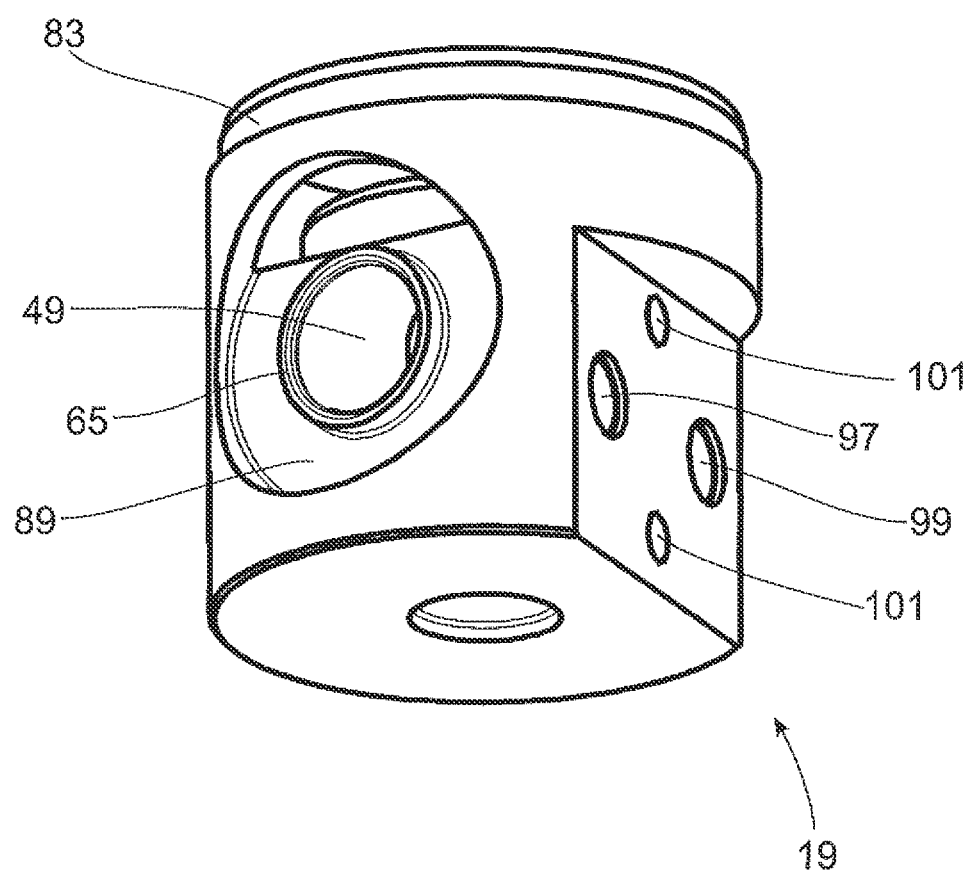

FIG. 2 shows an enlargement of the vibration damper 1 in the region of the line block 19, and the two adjustable damping valve devices 25; 29 connected thereto. In the enlargement, it is clearly evident that the second fluidic connection 27 is also connected to the line block 19, and the two fluidic connections 23; 27 inside the line block 19 each have a separate radial channel 49; 51 which is connected to a respective inlet opening 53; 55 of the damping valve devices 25; 29. With respect to the general structure and function of the two damping valve devices 25; 29, which are structurally identical, reference is made for example to DE 10 2013 218 658 A1.

It is also clear from FIG. 2 that a length portion 57 of the second fluidic connection 27 runs inside the line block 19 and within an axial projection surface 58 of the cylinder 3. The reducing piece 21 separates an annular chamber 59 inside the second fluidic connection 27, in the region of an end face 61 of the line block, from the working chamber 15 remote from the piston rod. This annular chamber 59 forms a radial transition inside the second fluidic connection 27, in the region of the outer casing surface of the cylinder 3 and the axial length portion 57 of the second fluidic connection 27 inside the line block 19. The radial channel 51 for the damping valve device 29 of the working chamber 13 on the piston rod side is connected to this axial length portion 57.

A length portion 63 of the first fluidic connection 23 runs concentrically inside the line block 19. This length portion 63 receives the reducing piece 21 and has the radial channel 49 in connection with a port connector 65 to the damping valve device 25 for the working chamber 15 remote from the piston rod. The two radial channels 49; 51 are axially congruent, wherein in this concrete exemplary arrangement, the two damping valve devices 25; 29 also have an identical axial distance from an end face 67 of the line block 19. Because of the annular chamber 59, the length portion 57 may be moved radially inward relative to the length portion 63, whereby also the distance between the port connectors 65; 69 for the two damping valve devices 25; 29 can be minimized.

The adjustable damping valve devices 25; 29 in this exemplary embodiment are designed to carry a fluid flow always from a working chamber 13; 15 in a direction of the balancing chamber 47. In order to refill the working chamber, which enlarges on a working stroke of the piston rod 5, sufficiently with damping medium, a check valve 71; 73, which opens in the flow direction from the balancing chamber 47 to the fluidic connections 23; 27, is assigned in a parallel circuit to each damping valve device 25; 29 and to the fluidic connection 23; 27 supplying the damping valve with damping medium. The check valve comprises a valve disc 75 and a closing spring 77 and is arranged between the port connectors 65; 69 and a housing part 79; 81 of the respective damping valve device 25; 29, and hence is independent of the intermediate tube 33 and the line block 19.

FIGS. 3 to 7 show the line block 19 from FIG. 1 as a separate component. The line block 19 has a peripheral annular web 83 as part of the centering lug. This annular web 83 is axially congruent with the container tube 41. In one exemplary arrangement, an outer housing 85 of the damping valve devices 25; 29 is connected pressure-tightly to the line block 19 in the region of the annular web 83. In one exemplary arrangement, the connection is a weld seam 87 (see FIG. 2). Furthermore, all axial channels 63; 57 open into the end faces 61 of the line block 19. The end face 61 delimits the balancing chamber 47 in the radially outer region between the connecting region 23 for the intermediate tube 33 and the annular web 83.

The connecting region 23 for the intermediate tube 33 is axially offset to the annular web 83 in a direction of the radial channels 49; 51, Accordingly, a receiving chamber 89; 91 for the two damping valve devices 25; 29 intersects the end face region of the balancing chamber 47. As a result, overflow channels are formed between the balancing chamber 47 and the damping valve devices 25; 29 and check valves 73; 75. Because of this arrangement of the active spaces and active faces, there is no need for a physically complex design of the connecting channels between the damping valve devices 25; 29 and check valves 71; 73 and the balancing chamber.

Furthermore, it is evident from a combined view of FIGS. 3 to 7 that the length portion 57 of the second fluidic connection 27 inside the line block 19 has a C-shaped cross-section. This shape offers a larger cross-section than a simple bore, so no choking effects occur.

Optionally, a pump device (not shown) may be connected to the line block for pumping damping medium alternately between the two working chambers 13; 15. For this, the line block 19 has a first and a second fluid port 97; 99 which open in the respective radial channels 49; 51 or the first and second fluidic connections 23; 27 inside the line block 19. For better understanding, threaded bores 101 for the pump device are shown.

On a piston rod retraction movement, the damping medium displaced by the piston rod 5 is conveyed from the working chamber 15 remote from the piston rod into the line block 19 via the first fluidic connection 23. The damping medium here passes the reducing piece 21 and then moves through the fluidic connection 23 to the radial channel 49 and on to the inlet opening 53 for the damping valve device 25. When the damping medium flows into the damping valve device 25, the check valve 71 closes. Accordingly, the damping medium is pressed through the damping valve device 25, where a main stage valve 103, actuated via an electromagnetic actuator 105 in conjunction with the pre-stage valve 107, opens the flow path to the balancing chamber 47.

During this piston rod retraction movement, the volume of the working chamber 13 on the piston rod side increases. A minimum pressure becomes established inside this working chamber and the connected fluidic connection 27. A main stage valve 109 of the second damping valve device 29 can assume any operating position, i.e. also block the flow path from the balancing chamber 47 through the damping valve device in the direction of the radial channel 51 and on to the second fluidic connection 27. However, the check valve 77, which is arranged hydraulically in parallel to the damping valve device 29, opens and clears the flow path from the balancing chamber 47 to the working chamber 15 remote from the piston rod, irrespective of the setting of the damping valve device 29.

Correspondingly, on a piston rod extension movement, damping medium is displaced from the working chamber 13 on the piston rod side into the second fluidic connection 27 via the connection opening 31, and flows into the second damping valve device 29 via the line block 19. The second damping valve device 29 creates a connection to the balancing chamber 47 via the main stage valve 109. In synchrony, damping medium flows via the check valve 71, parallel to the first damping valve device 25, into the first fluidic connection 23 and on into the enlarging working chamber 15 remote from the piston rod.

Figure 8:
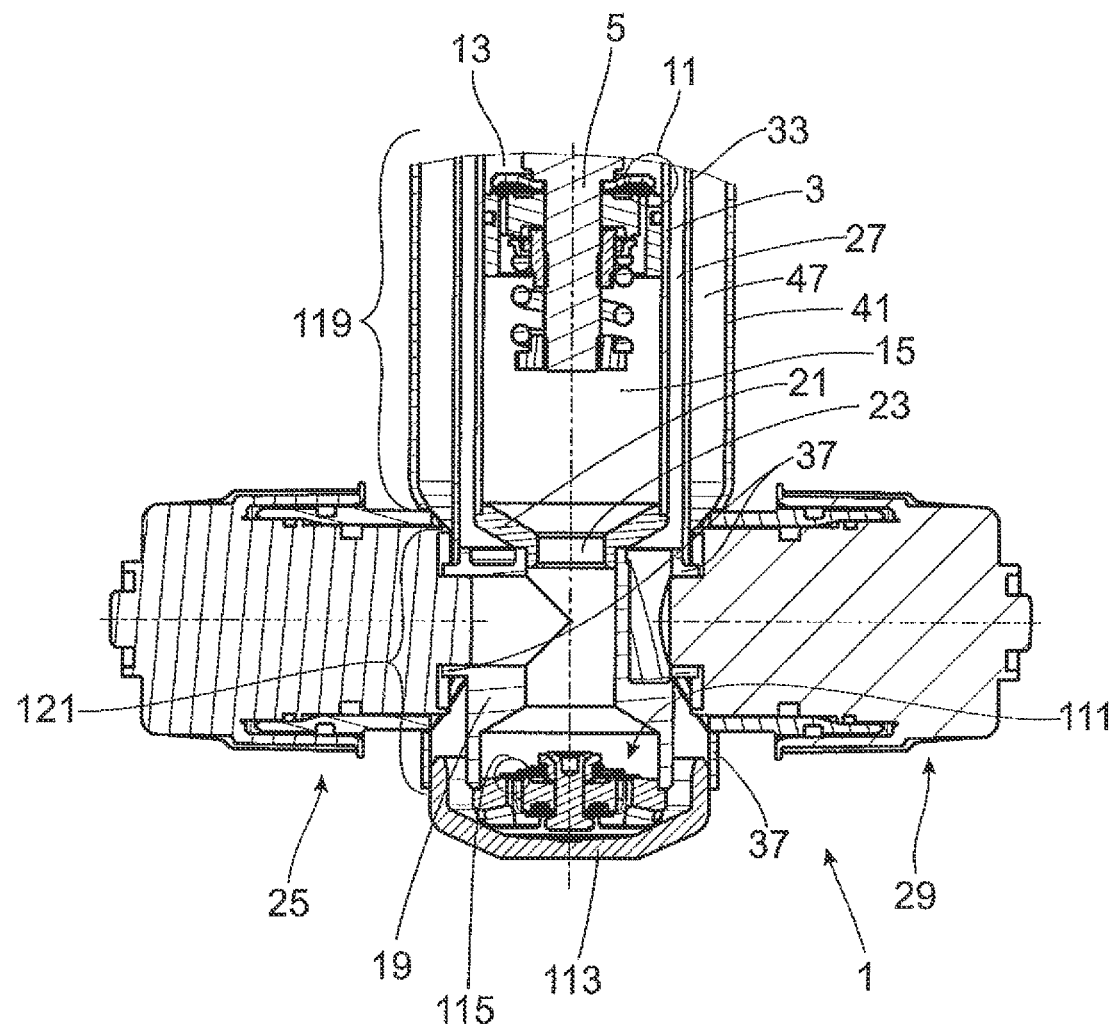
FIG. 8 alternative variants to FIGS. 1 and 2.

The design of the disclosure according to FIG. 8 is based on similar elements of the vibration damper 1 according to FIG. 1. By deviation, there is no check valve 71; 73 between the damping valve devices 25; 29 and the balancing chamber 47. Instead, this vibration damper has a bottom valve 111 between the first fluidic connection 23 and the balancing chamber 47. The bottom valve 111 is arranged on the end of the line block 19 opposite the reducing piece 21 and is clamped between a bottom 113 of the outer container tube 41 and the line block 19. The outer container tube 41 is thus in form-fit engagement in the region of the piston rod guide 17, as in the exemplary design in FIG. 1.

In the simplest design, the bottom valve 111 has a check valve 115 which opens on a piston rod extension movement of an associated flow, starting from the balancing chamber 47 into the working chamber 15 remote from the piston rod. In addition, the bottom valve 111 may also have a damping valve 117 which opens on a piston rod retraction movement and a working pressure above a limit pressure in the working chamber 15 remote from the piston rod, and is hydraulically active in parallel to the first damping valve device 25. The working chamber 13 on the piston rod side is fed from the volume of the working chamber 15 remote from the piston rod, via the damping valve 11 which opens in this flow direction. The damping valve 11 may be designed as a simple check valve without significant damping force function. Then always at most the volume of damping medium displaced by the piston rod 5 flows through the damping valve device 25.

As a variant from FIG. 1, the line block 19 is axially encapsulated by the container tube 41 so that the balancing chamber 47 extends to the bottom 113 of the container tube 41 and hence also on the outside of the line block 19. The line block 19 has no receiving chambers, but merely connectors 37. Accordingly, the diameter of the line block 19 outside the connectors 37 may be smaller than the inner diameter of the intermediate tube 33. The container tube 41 therefore has a greater outer diameter in a region 119 congruent with the cylinder 3 than in a region 121 congruent with the line block 19.

The invention claimed is:

1. A vibration damper comprising:
    first and second adjustable damping valve devices,
    a piston rod, and
    first and second fluidic connections;
    wherein the first damping valve device is connected to a first working chamber on a piston rod side via the second fluidic connection, and the second damping valve device is connected to a second working chamber remote from the piston rod, inside a cylinder filled with a damping medium,
    wherein the second fluidic connection between the first damping valve device and the first working chamber takes place via at least one tube element, and both first and second adjustable damping valve devices are connected to a common balancing chamber for receiving the damping medium displaced from the first and second working chambers by the piston rod,
    wherein a line block is connected to the cylinder and forms the first fluidic connection to the second damping valve device for the one of the working chambers, and forms an intermediate tube encasing the cylinder for the second fluidic connection to the first damping valve device for the first working chambers, wherein the second fluidic connection is also connected to the line block, and the first and second fluidic connections each have a separate radial channel inside the line block which is connected to a respective inlet opening of the first and second damping valve devices, wherein a reducing piece is arranged between the cylinder and the first fluidic connection of the line block, and the second fluidic connection runs inside the line block within a projection surface of the cylinder, and wherein the line block has a first and second fluid port for a pump device.

2. The vibration damper as claimed in claim 1, wherein the radial channels are axially congruent.

3. The vibration damper as claimed in claim 1, wherein the reducing piece is formed by a component separate from the line block.

4. The vibration damper as claimed in claim 1, wherein the first fluidic connection is connected to a bottom valve of the vibration damper which is arranged between the working chamber remote from the piston rod and the balancing chamber.

5. The vibration damper as claimed in claim 1, wherein the cylinder is encased by a container tube, wherein the container tube has a greater outer diameter in a region congruent with the cylinder than in a region congruent with the line block.

6. The vibration damper as claimed in claim 1, wherein a check valve is assigned to each of the first and second damping valve devices and to the respectively connected fluidic connections, and each opens in a flow direction from the balancing chamber into the respective first and second fluidic connections.

7. The vibration damper as claimed in claim 1, wherein the tube element is centered on a connector of the line block.

8. The vibration damper as claimed in claim 7, wherein the connector has a connection diameter which is the same as a connection diameter to a piston rod guide.

9. The vibration damper as claimed in claim 1, wherein the line block, together with a peripheral annular web and an end face, forms an end region of the balancing chamber, wherein a receiving chamber for the adjustable damping valve device is axially congruent with the balancing chamber.

10. A vibration damper comprising:
a cylinder in which an axially movable piston rod with a piston;
first and second adjustable damping valve devices,
wherein the piston divides the cylinder into first and second working chambers;
wherein the first damping valve device is connected to the first working chamber on a piston rod side via a first fluid line, and wherein the second damping valve device is connected to a second working chamber remote from a piston rod disposed inside the cylinder filled with a damping medium;
wherein the first fluid line between the first damping valve device and the first working chamber is constructed as an intermediate tube; and
both first and second adjustable damping valve devices are connected to a common balancing chamber for receiving the damping medium displaced from the first and second working chambers by the piston rod;

wherein a line block is connected to the cylinder and forms a second fluid line to the second damping valve device for the second working chamber, wherein the intermediate tube encases the cylinder to form an annular chamber between the intermediate tube and an outer casing surface of the cylinder and forming a portion of the first fluid line to the first damping valve device for the first working chamber, wherein the first fluid line is also connected to the line block, and wherein the first and second fluid lines each have a separate radial channel inside the line block which is connected to a respective inlet opening of the first and second damping valve devices;

wherein a reducing piece is arranged between the cylinder and the first fluid line of the line block, and the second fluid line runs inside the line block within a projection surface of the cylinder; and wherein a length portion of the first fluid line receives the reducing piece and has the radial channel of the first fluid line in connection with a port connector to the first damping valve device for the first working channel.

11. The vibration damper of claim 10, wherein the reducing piece is formed as a separate component from the line block.

12. The vibration damper of claim 10, wherein the reducing piece is a fixed part of a wall surface of the cylinder.

13. The vibration damper of claim 10, wherein the cylinder and the intermediate tube are encased by an outer container tube and defines an annular chamber between the intermediate tube and an inner wall of the container tube to define the balancing chamber.

14. The vibration damper of claim 10, wherein the reducing piece separates an annular chamber inside the second fluid line from the second working chamber.

15. The vibration damper of claim 10, wherein a check valve is assigned to each of the first and second damping valve devices and to the respectively connected first and second fluid lines, and each check valve opens in a flow direction from the balancing chamber into the respective first and second fluid lines.

16. The vibration damper of claim 15, wherein each of the check valves is arranged between port connectors and a housing part of the respective first and second damping valve devices.

17. The vibration damper of claim 10, wherein the line block includes a peripheral annular web and an end face which form an end region of the balancing chamber, wherein respective receiving chambers for the first and second damping valve devices intersects the end face region to form overflow channels between the balancing chamber and the first and second damping valve devices and check valves.

18. The vibration damper of claim 10, wherein the line block has a first and a second fluid port for a pump device.

19. A vibration damper comprising:
first and second adjustable damping valve devices,
a piston rod, and
first and second fluidic connections;
wherein the first damping valve device is connected to a first working chamber on a piston rod side via the second fluidic connection, and the second damping valve device is connected to a second working chamber remote from the piston rod, inside a cylinder filled with a damping medium,
wherein the second fluidic connection between the first damping valve device and the first working chamber takes place via at least one tube element, and both first and second adjustable damping valve devices are connected to a common balancing chamber for receiving the damping medium displaced from the first and second working chambers by the piston rod, wherein a line block is connected to the cylinder and forms the first fluidic connection to the second damping valve device for the one of the working chambers, and forms an intermediate tube encasing the cylinder for the second fluidic connection to the first damping valve device for the first working chambers, wherein the second fluidic connection is also connected to the line block, and the first and second fluidic connections each have a separate radial channel inside the line block which is connected to a respective inlet opening of the first and second damping valve devices, wherein a reducing piece is arranged between the cylinder and the first fluidic connection of the line block, and the second fluidic connection runs inside the line block within a projection surface of the cylinder, and wherein the cylinder is encased by a container tube, wherein the container tube has a greater outer diameter in a region congruent with the cylinder than in a region congruent with the line block.

* * * * *